Dec. 17, 1957  F. L. DAGGETT  2,816,518
ICE CREAM BLENDING APPARATUS
Filed Jan. 10, 1956

Inventor:
Fred L. Daggett,
by Aubrey D. Thomson
Attorney

United States Patent Office 2,816,518
Patented Dec. 17, 1957

2,816,518

ICE CREAM BLENDING APPARATUS

Fred L. Daggett, Newton, Mass. assignor to Daggett Chocolate Company, Cambridge, Mass., a corporation of Massachusetts Application January 10, 1956, Serial No. 558,362

4 Claims. (Cl. 107—1)

The present invention relates to mixing apparatus for blending semi-fluid materials, for example for blending ice cream and syrup to produce so-called "ripple" or "whirl" ice cream. Syrups of various colors and flavors are mixed in such a manner as to create a streaked or marbled effect.

In the manufacture of ripple ice cream it has heretofore been customary to blend the plain ice cream and syrup, passing under pressure through a mixing chamber, by means of paddles which are driven electrically or mechanically from some external power source. As sanitary requirements in the manufacture are very stringent, it is necessary to dismantle and sterilize frequently all parts which come in contact with the food, and electrical connections, and movable shafts passing through to the outside of mixing devices, always present a difficult cleaning problem and a possible source of contamination.

The object of this invention is to provide a blending device which produces ripple or whirl ice cream of uniformly attractive appearance, which requires no external driving connections for the mixing element, which is simple to construct and install, and which can be easily dismantled for cleaning and sterilizing.

The device consists in general of an outer tube, an inner tube of smaller diameter mounted concentrically in the outer tube and having several outlets and spouts, and a spiral-bladed paddle rotatably mounted on the lower end of the inner tube. Ice cream is forced under pressure through the outer tube, and the paddle is so shaped that it is rotated by the flow of ice cream. The syrup is forced under pressure into the inner tube and emerges through the spouts. The emerging streams of syrup are mixed with the ice cream in passing by the paddle to produce the desired marbled effect.

For a fuller understanding of the nature and objects of the invention, reference should be had to the following detailed description taken in connection with the accompanying drawing wherein.

Figure 1:
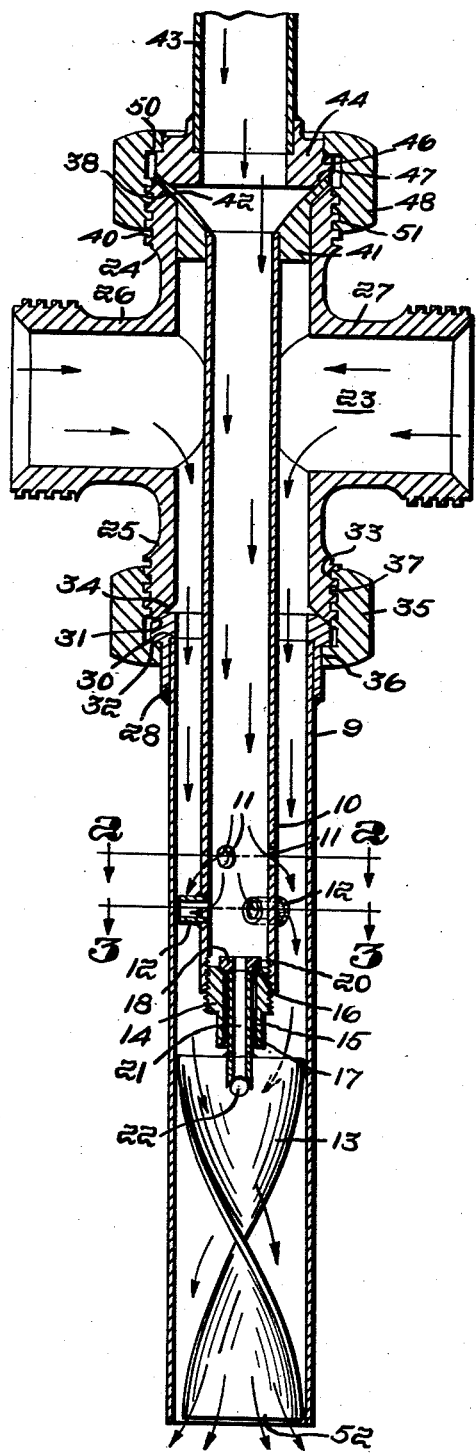
Fig. 1 is a sectional view of an apparatus embodying the present invention, the section being taken along a plane through the longitudinal axis of the apparatus.

The illustrated apparatus comprises an outer tube 9 through which ice cream is advanced under pressure, an inner tube 10 through which syrup is advanced under pressure, three holes 11 in the lower portion of inner tube 10, and three spouts 12 which project radially from the lower portion of inner tube 10 for injecting streaks of the syrup into the ice cream, and a convolute blade 13 which is rotated by the advancing syrup and ice cream mixture and serves to fold the mixture to form spiral streaks.

The lower end of inner tube 10 is internally threaded for the reception of an externally threaded plug 14 which has a central opening 15 with a chamfered upper rim 16.

Freely mounted in opening 15 is a tubular shaft 17 which is secured at its lower end to blade 13 which is notched to receive the shaft. Secured to the upper end of shaft 17 is a head 18, the lower periphery of which has a bevelled shoulder 20 which is seated on rim 16. A passage 21 extends through head 18 and shaft 17 to a hole 22 running transversely through the blade for injecting streaks of syrup into portions of the ice cream that have not been streaked by syrup from holes and spouts 11 and 12.

A four-way coupling 23 serves to conduct ice cream to outer tube 9 and to support inner tube 10 within the outer tube. Coupling 23 includes a pair of vertical branches 24 and 25 and a pair of horizontal branches 26 and 27.

Coupling 23 is secured to outer tube 9 in the following manner. Connected to the upper end of outer tube 9 is a collar 28 having an internal flange 30 fitting over the upper end of the tube and creating a continuous smooth inner surface. The upper end of boss 28 has a bevelled upper rim 31 and an external shoulder 32. The lower branch 20 of coupling 23 has external threads 33, and a bevelled lower rim 34 seated on rim 31. Coupling 23 is locked to boss 28 by a nut 35, having an internal flange 36 which engages shoulder 32, and internal threads 37 which mesh with threads 33.

The upper extension 24 of coupling 23 has a bevelled rim 38 and external threads 40. Secured to the upper end of inner tube 10 is a collar 41 having an oblique flange 42. The lower surface of flange 42 is seated on rim 38. A suitable feed pipe 43 for syrup carries a collar 44, which has an external shoulder 46 and a bevelled rim 47 seated in flange 42. Flange 42 is clamped between rim 38 and rim 47 by a nut 48 having an internal flange 50 which engages shoulder 46 and internal threads 51 which mesh with threads 40. When flange is thus clamped, tube 10 is properly positioned within tube 9 with the outer ends of spouts 12 slightly spaced from the wall of tube 9.

Extensions 26 are coupled to collared feed pipes (not shown) similar to pipe 43 and collar 44 by means of nuts such as nut 48.

When the illustrated apparatus is in operation, ice cream, in pasty condition, is fed under pressure from a supply tank of conventional type, through extensions 26 and 27 into the region between the adjacent surfaces of tubes 9 and 10. Syrup is fed under pressure from tube 43 into tube 10 and emerges through holes 11, spouts 12, and hole 22, all of which serve as outlet ports for the syrup.

Figure 2:
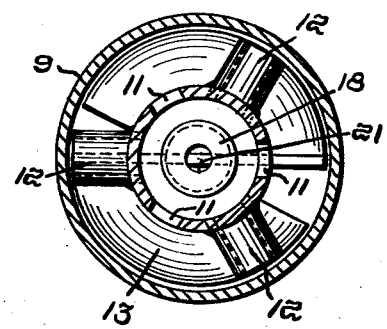
Fig. 2 is a cross-sectional view, taken along the line 2—2 of Fig. 1.
Figure 3:
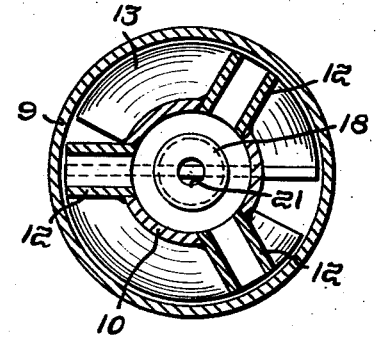
Fig. 3 is a cross-sectional view taken along the line 3—3 of Fig. 2.

It is apparent, from the positions of these ports, that streams of syrup of about the same size will enter the ice cream at spaced portions in such a manner as to create streaks distributed fairly uniformly in the mixture. The pressure of the ice cream advancing past the blade 13 causes the blade to rotate, due to its spiral shape, in a clockwise direction as viewed in Figs. 2 and 3. The streaks of syrup thus become twisted into spiral or whirl shapes by the time the blended syrup and ice cream emerge from the open lower end 52 of tube 10. The blended ice cream may be discharged into containers or packages of any desired size for bulk sale, or the mixing apparatus may be used in a soda fountain for filling dishes or cups, as required. It is understood that the supply pipes are equipped with suitable manual or automatic valves, and that the mixing device operates whenever the valves are opened.

For cleaning and sterilizing the device may be easily dismantled by unscrewing nuts 35 and 48, and the coupling nuts for branches 26 and 27. Tube 10 may then be lifted out of tube 9, along with the blade 13 and its shaft 17. The parts of the device are preferably made of stainless steel, or a similar non-corrosive material which will withstand sterilizing, and the threads are preferably of a standard square type approved by public health authorities for use on dairy equipment. The device is thus simple to dismantle and assemble and yet meets the most rigid standards for sanitation.

The blade 13, which may be shaped to revolve in either direction, operates automatically whenever ice cream flows through the device and requires no external driving connections. The speed of its revolution varies substantially in proportion to the speed of flow, and the blended product will thus be uniform in appearance, even though the pressure in the feed lines may vary from time to time. No lubrication or packing is required for the shaft 17, as the syrup itself will serve as an adequate lubricant.

As here illustrated, there are three radial holes 11 equally spaced around tube 10, three radial spouts, staggered from the holes 12, and discharging close to the wall of tube 9, and two central discharge ports provided by hole 22. The number and arrangement of the discharge ports can be varied as desired to suit particular conditions.

Since certain changes may be made in the above product without departing from the scope of the invention herein involved, it is intended that all matter contained in the above description and shown in the accompanying drawings, shall be interpreted in an illustrative and not in a limiting sense.

What is claimed is:

1. Ice cream blending apparatus comprising a four-way coupling having an upper and a lower branch and two side branches, said side branches being adapted for connection to a source of ice cream, and said upper branch having a bevelled rim, a first tube connected to said lower branch and having an open lower end, a second tube, of smaller diameter than said first tube, having a bevelled collar seating on said rim and supporting the second tube in concentric relationship with the first, said tubes defining between them a passage communicating with said side branches and the second tube having a lower end disposed above that of the first, means for connecting the upper end of said second tube to a source for supplying syrup, said second tube having a number of openings and a number of sidewardly projecting spouts for discharging streams of syrup into said passage, and a blade mounted on the lower end of said second tube, said blade being of spiral shape adapted to rotate upon contact with ice cream and syrup mixture passing downward toward the lower end of said first tube.

2. Ice cream blending apparatus comprising a first tube adapted for connection to a source for supplying ice cream and having a mouth adapted to discharge ice cream received from said source, a second tube mounted in said first tube and spaced therefrom to form a passage through which ice cream may flow toward said mouth, said second tube having an end spaced inward from said mouth, a blade rotatably mounted in said first tube between said end and said mouth and shaped to rotate upon contact with ice cream moving toward said mouth, said second tube having a number of spaced radially disposed holes and a number of radial spouts disposed in offset and staggered relationship to said holes, the holes and spouts serving as ports for discharging fluid into said passage.

3. Ice cream blending apparatus comprising a first tube adapted for connection to a source for supplying ice cream and having a mouth adapted to discharge ice cream received from said source, a second tube mounted in said first tube and spaced therefrom to form a passage through which ice cream may flow toward said mouth, said second tube having an end spaced inward from said mouth, a blade rotatably mounted in said first tube between said end and said mouth and shaped to rotate upon contact with ice cream moving toward said mouth, said second tube having a number of spaced ports adapted to discharge fluid substantially radially into said passage.

4. Ice cream blending apparatus comprising a first tube adapted for connection to a source for supplying ice cream and having a mouth adapted to discharge ice cream received from said source, a second tube mounted in said first tube and spaced therefrom to form a passage through which ice cream may flow toward said mouth, said second tube having an end spaced inward from said mouth, a tubular shaft rotatably mounted in said end, a blade mounted on said shaft between said end and said mouth and shaped to rotate upon contact with ice cream moving toward said mouth, said blade having an opening communicating with the interior of said shaft and serving as a port for discharge of fluid from said second tube.

References Cited in the file of this patent

UNITED STATES PATENTS

| | | |
|---|---|---|
| 2,409,339 | Ballard | Oct. 15, 1946 |
| 2,669,946 | Peyton | Feb. 23, 1954 |